(12) United States Patent
Liang et al.

(10) Patent No.: US 10,756,828 B2
(45) Date of Patent: Aug. 25, 2020

(54) MILLIMETER WAVE RF CHANNEL EMULATOR

(71) Applicants: Ping Liang, Newport Coast, CA (US); Dengkui Zhu, Beijing (CN)

(72) Inventors: Ping Liang, Newport Coast, CA (US); Dengkui Zhu, Beijing (CN)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 16/214,078

(22) Filed: Dec. 9, 2018

(65) Prior Publication Data

US 2019/0181963 A1 Jun. 13, 2019

Related U.S. Application Data

(60) Provisional application No. 62/597,089, filed on Dec. 11, 2017.

(51) Int. Cl.
| | |
|---|---|
| *H04B 17/00* | (2015.01) |
| *H04B 7/0456* | (2017.01) |
| *H04L 5/00* | (2006.01) |
| *H04B 7/0452* | (2017.01) |
| *H04B 7/06* | (2006.01) |
| *H04B 7/10* | (2017.01) |
| *H04B 17/318* | (2015.01) |

(52) U.S. Cl.
CPC ....... *H04B 17/0085* (2013.01); *H04B 7/0452* (2013.01); *H04B 7/0469* (2013.01); *H04B 7/0608* (2013.01); *H04B 7/10* (2013.01); *H04B 17/0087* (2013.01); *H04B 17/318* (2015.01); *H04L 5/0048* (2013.01)

(58) Field of Classification Search
CPC .. H04W 24/06; H04W 16/28; H04B 17/3912; H04B 17/3911; H04B 7/0413; H04B 17/15; H04B 17/309; H04B 7/046; H04B 17/391; H04B 7/10; H01Q 3/267
See application file for complete search history.

(56) References Cited

U.S. PATENT DOCUMENTS

| | | | |
|---|---|---|---|
| 2016/0352402 A1* | 12/2016 | Park | H04B 7/10 |
| 2017/0359739 A1* | 12/2017 | Reed | H04B 17/15 |
| 2018/0212695 A1* | 7/2018 | Kyrolainen | H04B 17/3912 |
| 2019/0115989 A1* | 4/2019 | Rodriguez-Herrera | H04B 17/391 |

* cited by examiner

*Primary Examiner* — Jung Liu
(74) *Attorney, Agent, or Firm* — Guosheng Wang; United States Research and Patent Firm

(57) ABSTRACT

This invention presents a RF channel emulator for testing a millimeter wave (mmWave) wireless communication system, including embodiments of using over-the-air channels for connecting a RF channel emulator and mmWave wireless communication system, placement of antenna arrays, antenna array design, antenna selection, and polarization matrices estimation that complete both the beam scanning at the BS and UEs and normal data transmission.

17 Claims, 8 Drawing Sheets

(a) The first selected antenna transmitting pilot in the first time slot (b) The first selected antenna transmitting pilot in the first time slot

MILLIMETER WAVE RF CHANNEL EMULATOR

FIELD OF INVENTION

This invention relates generally to a centimeter or millimeter wave channel emulator for a Multiple Input Multiple Output (MIMO) system, and more particularly, to over-the-air connection between a base station (BS) and channel emulator.

BACKGROUND

With the explosive growth of mobile data demand, future wireless networks would exploit new available frequency spectra, i.e., centimeter to millimeter wave (mmWave) brands, to greatly increase communication capacity. The fundamental differences between mmWave communication systems and the existing micro-wave systems operating below 5 GHz are high propagation loss, directivity, and sensitivity to blockage. To address this issue, directional beamforming with very high gain generated by an antenna array containing a large number of antenna elements has been considered as an essential technique to improve the signal strength level at the receiver. Because of the highly directional antenna employed at the BS or User Equipment (UE), beam or direction scanning at the BS and/or UE is required to achieve seamless coverage like the conventional cellular network. In addition, to further increase the system capacity, multiple antenna arrays are used at the BS and/or UE so that MIMO technique even Multi-User MIMO (MU-MIMO) technique can be employed in mmWave communication systems. One of the most important techniques to realize MIMO and MU-MIMO in mmWave communication systems is hybrid beamforming (HB), which is the combination of analog beamforming for Radio Frequency (RF) signals and precoding for digital or baseband signals that can be employed at both the BS and UE. The adaptive analog beamforming can complete beam/direction scanning with a high gain beam while the precoding can remove the interferences among the multiplexed data streams in MIMO and/or MU-MIMO.

Because of the small size of mmWave antenna array, it is may be integrated with the RF circuits, which means that there are no antenna ports for using cables to connect the BS RF paths to the channel emulator as the conventional method dose when testing the BS. Moreover, connecting each antenna element of the BS to the corresponding antenna element of the channel emulator directly with a waveguide or other similar techniques is still impossible as the size of each antenna element and the space between any two antenna elements are two small to place these huge number of waveguides. Other methods like passing the digital signals before digital-to-analog converter (DAC) at the BS to the channel emulator directly still faces a problem, i.e., the adaptive analog beamforming at the BS and the corresponding beam scanning cannot be emulated at the emulator. In summary, there are no prior art hardware RF channel emulator exits that meet these needs. This invention presents circuits and methods for building a hardware RF channel emulator that meet the needs of testing of mmWave communication systems.

BRIEF DESCRIPTION OF DRAWINGS

Abbreviations used in the following list of drawings are defined in the next section which provides the detailed description of the embodiments of the invention.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

In the following descriptions, an antenna and a RF path is used interchangeably to indicate a Transmit (Tx) and/or Receive (Rx) RF circuit and an antenna connected to it unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing. Hereafter, a pilot signal may mean a signal transmitted by one antenna for the purpose of estimating the channel between the transmitting antenna and one or more receiving antennas. It may also be called a reference signal, a channel estimation signal or a test signal. Furthermore, the term "millimeter wave" or "mmWave" is used to indicate a radio wave with frequency typically above 10 GHz, thus having wavelength in sub-millimeter, sub-centimeters or a few centimeters.

Figure 1:
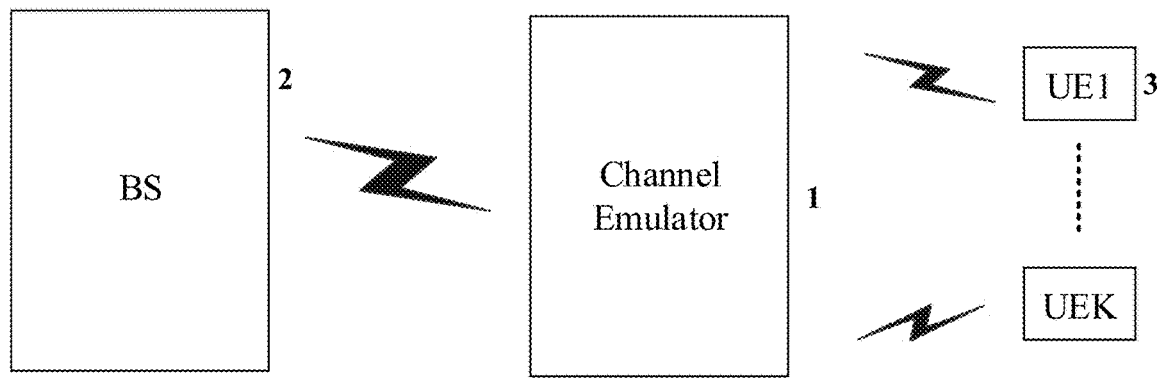
FIG. 1 shows a block diagram of the channel emulator

For mmWave wireless communication systems, the channel emulator is used to emulate the over-the-air channel between BS and UEs so that the beam scanning and data transmission between the BS and UEs can be tested and verified. As shown in FIG. 1, the channel emulator 1 placed between the BS 2 and UEs 3 is connected to the BS and UEs through wireless channel, e.g., over the air, instead of cable in a conventional channel emulator.

Figure 2:
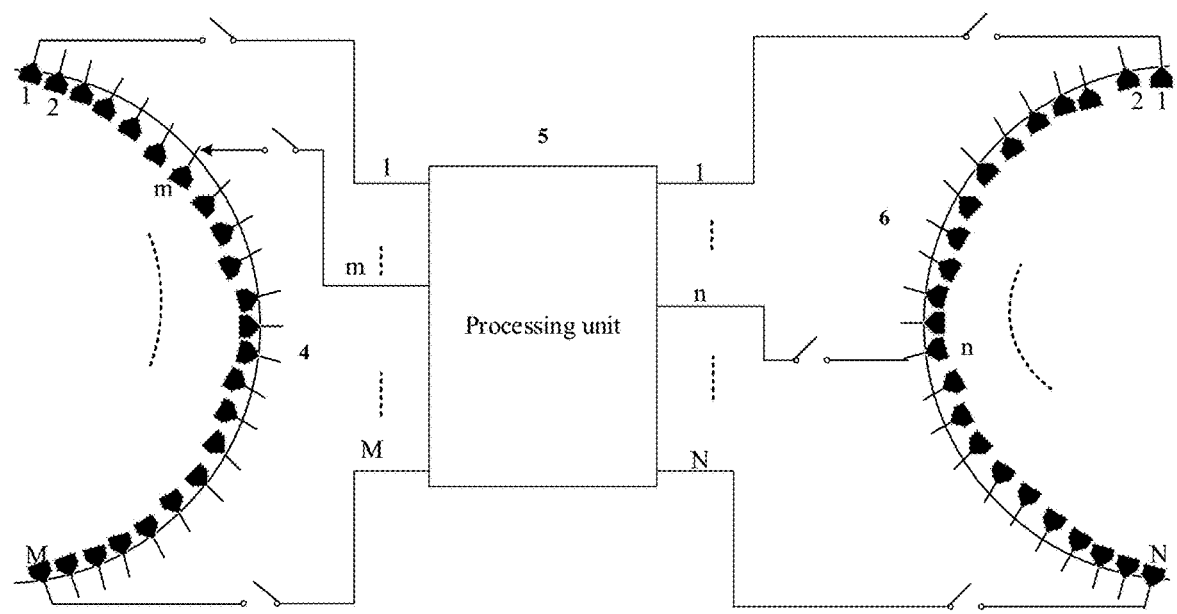
FIG. 2 shows the major components of the channel emulator

As shown in FIG. 2, the mmWave channel emulator is mainly consisted of three components, i.e., antenna arrays facing the BS 4 for receiving signals from the BS in the downlink and transmitting signals to the BS in the uplink, a processing unit 5 that completes RF signal receiving and transmitting, converting RF signals to digital signals and vice versa, generating channel coefficients related parameters, and emulating signal passing through wireless channels, and antenna arrays facing UEs 6 for transmitting signals to UEs in the downlink and receiving signals from UEs in the uplink. For multiple UEs case, an exclusive antenna array is employed facing each UE. Note that those parameters for generating channel coefficients also can be generated in offline and downloaded into this processing unit. Each antenna in the antenna arrays of channel emulator is connected to the processing unit through a cable, fiber or other wired connection and each connection can be turned on and off through an adaptively controlled switch. The antenna array facing the BS can be fan-shaped, circular or spherical, where the size of the array, e.g., radius of the array, depends on the angle coverage range of the BS and the carrier frequency, and the number of antennas in an array is determined by the angular resolution to be provided by the channel emulator. The antenna arrays facing UEs can be fan-shaped, circular or spherical, where the size of the array, e.g., radius of the antenna array, depends on the deployment scenario and the carrier frequency, and the number of antennas in an array is determined by the angular resolution of the channel emulator to be provided. In addition, the antenna element can be single-polarized or cross-polarized.

For the antenna arrays of the channel emulator, each single-polarized antenna element or each co-located cross-polarized antenna pair is associated to one or a pair specific spatial angles.

Figure 3:
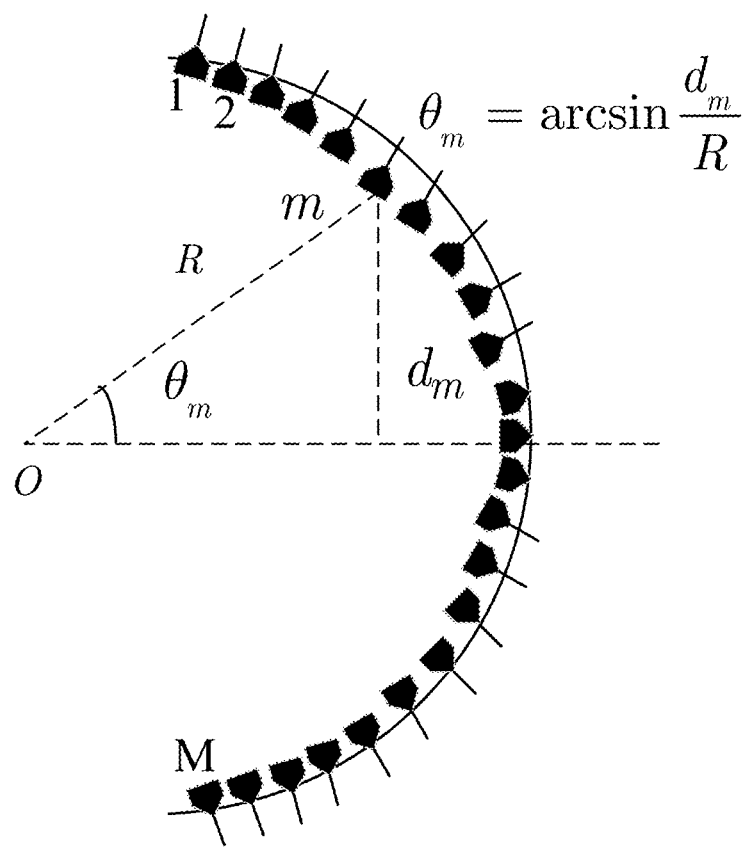
FIG. 3 shows the spatial angle associated to each antenna for a one dimensional antenna array

FIG. 3 shows an embodiment of a one dimensional fan-shaped antenna array 7 facing the BS with single-polarized antenna elements, where each antenna is associated to a spatial angle that is determined by the position of the antenna in the array and the radius of the antenna array. In this embodiment, the radius of this antenna array is R and the coordination of the $m^{th}$ antenna in the vertical dimension is $d_m$. Then, the spatial angle associated to the $m^{th}$ antenna is determined by $$\theta_m = \arcsin\frac{d_m}{R}, m = 1, \ldots, M.$$

The mapping between each antenna element and the associated spatial angle is stored in a table in the memory of the processing unit. Similarly, each antenna element in the antenna arrays facing the UEs is associated to a specific angle the corresponding mapping is also stored in a table in the memory of the processing unit.

Figure 4:
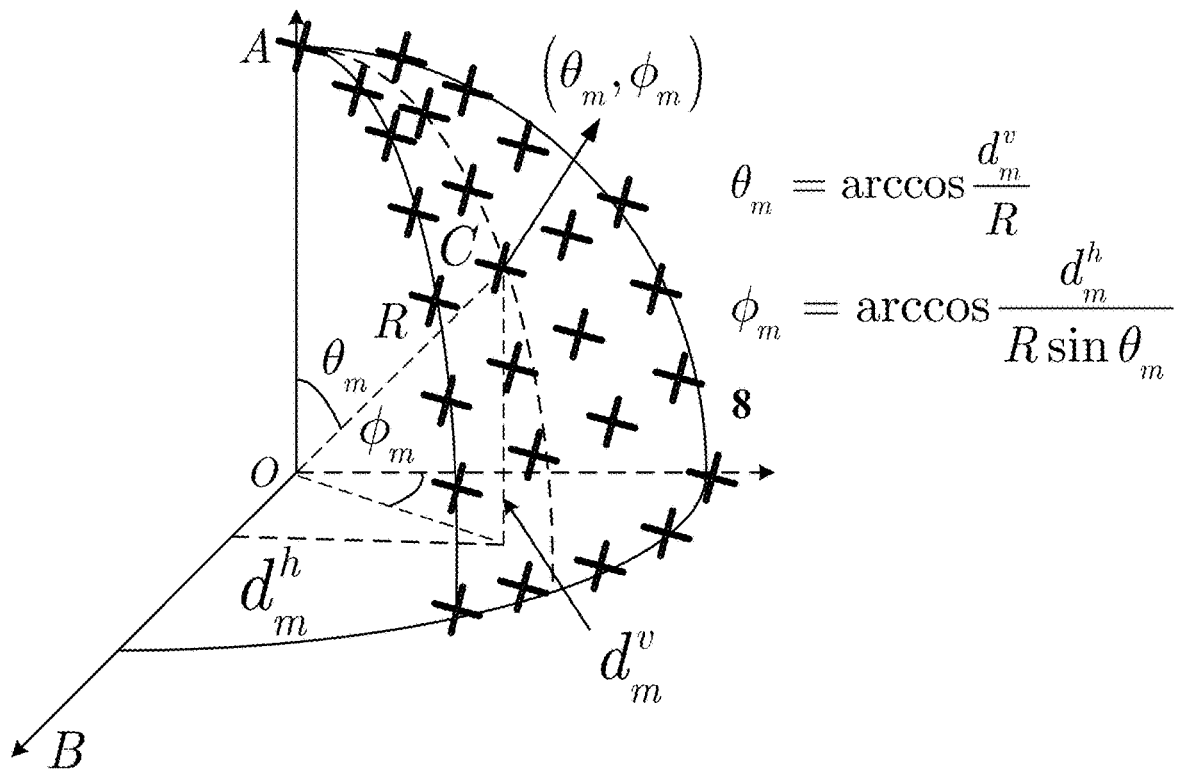
FIG. 4 shows the spatial angle associated to each antenna for a two dimensional spherical antenna array

FIG. 4 shows another embodiment of a two dimensional spherical antenna array 8 with cross-polarized antenna element, i.e., each antenna is located at the sphere surface, where every two co-located cross-polarized antennas are associated to the same two spatial angles that are derived based on the location of the antennas in the array and the radius of the array. In this embodiment, the radius of this antenna array is R and the coordination of the $m^{th}$ cross-polarized antenna pair in the vertical dimension and horizontal dimension are $d_m^v$ and $d_m^h$ respectively. Then, for the $m^{th}$ antenna pair, the two associated spatial angles $(\phi_m, \theta_m)$ are determined by $$\theta_m = \arccos\frac{d_m^v}{R} \text{ and } \phi_m = \arccos\frac{d_m^h}{R\sin\theta_m}$$

respectively. The mapping between each cross-polarized antenna pair and the associated spatial angles is stored in a table in the memory of the processing unit. Similarly, each cross-polarized antenna pair in the antenna arrays facing the UEs is associated to two specific angles and the corresponding mapping is also stored in a table in the memory of the processing unit.

Figure 5:
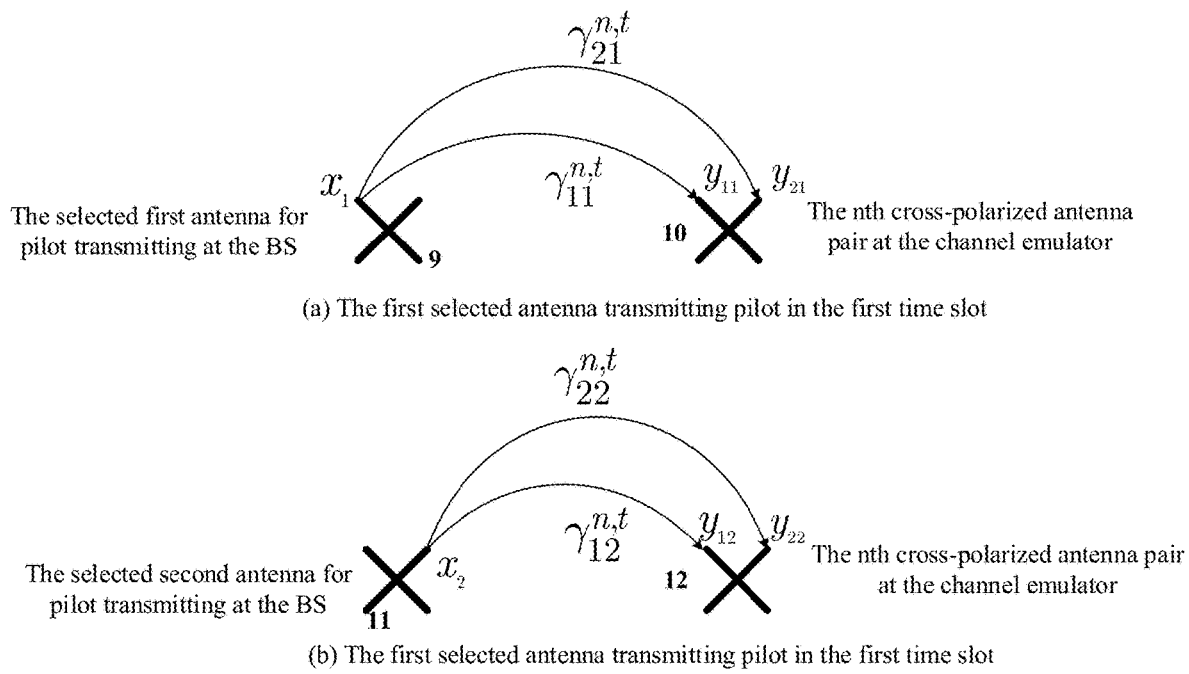
FIG. 5 shows the estimation of polarization matrix between the BS and channel emulator

When a cross-polarized antenna array is used at the BS, cross-polarized antenna array facing the BS also need to be used at the channel emulator. Similarly, cross-polarized antenna array facing the UE is also needed to be used at the channel emulator when a UE is equipped with a cross-polarized antenna array. The channel emulator needs to estimate the polarization matrices between the BS and each cross-polarized antenna pair in the array facing the BS and between each UE and each cross-polarized antenna pair in the array facing the UE so that it can compensate them when working in channel emulation mode. Specifically, to estimate the polarization matrix between the BS and channel emulator, two co-located cross-polarized antenna elements at the BS are selected to transmit pilots to the channel emulator in two mutually orthogonal radio resources, e.g., in two different symbols or in the same symbol with different frequency bands. To realize the antennas selection at the BS, a special analog beamforming or antenna virtualization vector w is applied in each antenna sub-array with the same polarization, e.g., w=[0 . . . 0 1 0 . . . 0], where the element 1 in this vector indicates the location of the selected antenna in the sub-array to transmit pilots. At the channel emulator, with the received pilot signals from the antenna array facing the BS, the processing unit estimates the polarization matrices for each of the M co-located cross-polarized antenna pairs as $\Gamma_1^t, \ldots, \Gamma_M^t$. To estimate these polarization matrices between a UE and the channel emulator, similar antenna selection, pilot transmission and reception, and polarization coefficient estimation can be conducted and the results are denoted by $\Gamma_1^r, \ldots, \Gamma_N^r$. When the antenna array at the BS or UE consists of multiple sub-arrays, e.g., a rectangular panel array that consists of multiple panels, any one of these subarrays can be selected to complete the above pilot transmission FIG. 5 shows an embodiment of polarization matrix estimation, where the antenna array at the channel emulator facing the BS has M pairs of polarized antennas. One of the selected antenna 9 at the BS transmits pilot signal $x_1$ at the time slot 1, and the received signals at the $m^{th}$ cross-polarized antenna pair 10 facing the BS at the channel emulator are $y_{11}$ and $y_{21}$ respectively. Similarly, the other selected antenna 11 at the BS transmits pilot signal $x_2$ at the time slot 2, and the received signals at the $m^{th}$ cross-polarized antenna pair 12 facing the BS at the channel emulator are $y_{12}$ and $y_{22}$ respectively. Then, the polarization matrix for the $m^{th}$ polarization matrix, m=1, . . . , M, can be estimated as $$\Gamma_m^t = \begin{bmatrix} \gamma_{11}^{m,t} & \gamma_{12}^{m,t} \\ \gamma_{21}^{m,t} & \gamma_{22}^{m,t} \end{bmatrix} = \begin{bmatrix} y_{11}/x_1 & y_{12}/x_2 \\ y_{21}/x_1 & y_{22}/x_2 \end{bmatrix}.$$

With the similar method, the N polarization matrices between the channel emulator and a UE can be estimated as $\Gamma_1^r, \ldots, \Gamma_N^r$.

Single-User MIMO (SU-MIMO) Channel Emulation

Figure 6:
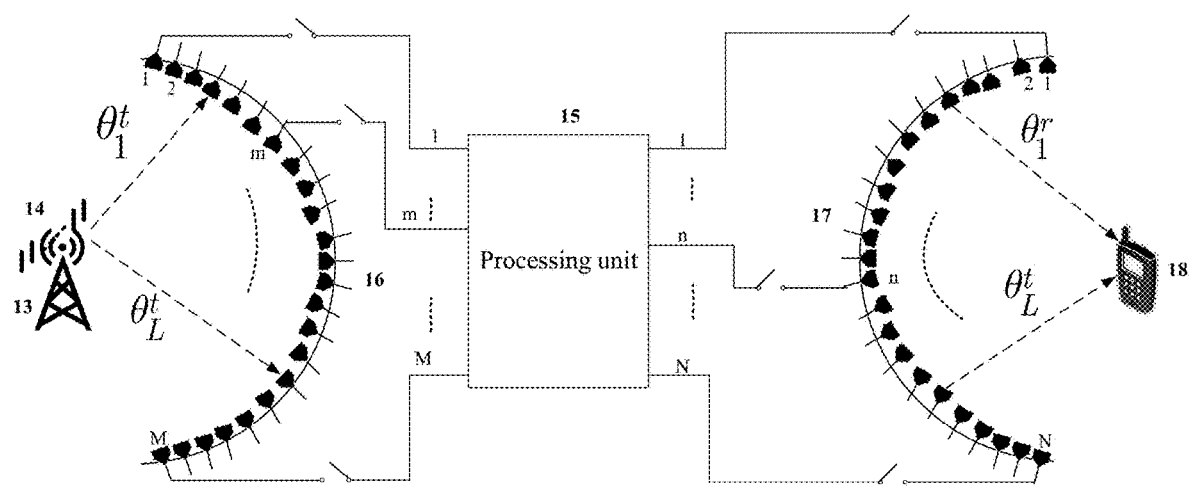
FIG. 6 shows a channel emulator for SU-MIMO with single-polarized one dimensional antenna array

One embodiment of this emulator is used to emulate single-UE scanning and data transmission. As shown in FIG. 6, the BS 13 is equipped with a linear antenna array 14 with single-polarized antenna elements in the horizontal dimension, the emulator 15 is equipped with two semicircle antenna arrays, 16, 17, with single-polarized antenna elements in the horizontal dimension facing the BS antenna array and facing UE antenna array 18 respectively. For channel emulation, the BS antenna array is placed at the center of the semicircle antenna array of the channel emulator that faces the BS and the UE is placed at the center of the semicircle antenna array of the channel emulator that faces the UE. The processing unit of channel emulator generates parameters for calculating the channel coefficients between the BS and UE, including the number of multi-path components (MPCs) L, the angles associated to each MPC at the BS side, e.g., $\theta_1^t, \ldots, \theta_L^t$, the angles associated to each MPC at the UE side, e.g., $\theta_1^r, \ldots, \theta_L^r$, the power fading factor associated to each multi-path, e.g., $P_1, \ldots, P_L$, time delay associated to each MPC, e.g., $\tau_1, \ldots, \tau_L$, and the direction of the relative movement between the UE and BS. With $\theta_1^t, \ldots, \theta_L^t$, the processing unit looks up the table containing the mappings between each antenna element of the antenna array facing the BS and the corresponding spatial angle and determines the L antennas $a_1^t, \ldots, a_L^t$ whose associated angles are closest to $\theta_1^t, \ldots, \theta_L^t$ respectively. Then, the processing unit turns on the connections between itself and these L antennas. With the similar method, the processing unit determines the L antennas $a_1^r, \ldots, a_L^r$ corresponding to $\theta_1^r, \ldots, \theta_L^r$ in the antenna array facing the UE and turns on the connections between itself and these L antennas. In the downlink, at the time instant t, the processing unit first receives the L RF signals from the L connected antenna $a_1^t, \ldots, a_L^t$ facing the BS and converts them into digital signals, e.g., $s_1(t), \ldots, s_L(t)$. Then, the received signals $s_1(t), \ldots, s_L(t)$ are delayed and scaled as $P_sP_1s_1(t-\tau_1)e^{j\omega_1 t}, \ldots, P_sP_Ls_L(t-\tau_L)e^{j\omega_L t}$, where $P_s$ is a common scaling factor emulating the path-loss level between the BS and UE, and $e^{j\omega_1 t}, \ldots, e^{j\omega_L t}$ denote the Doppler effect caused by the relative movement between the BS and UE. Finally, these L signals are converted to analog RF signals and transmitted to the UE through the L connected antennas $a_1^r, \ldots, a_L^r$ facing the UE. The uplink emulation is same to the downlink except exchanging the receiving and transmitting antennas. Note that to emulate a specific path-loss level between the BS and UE or specific receiving signal strength at the UE or BS, the processing unit may need to remove the path-loss factor between itself and the UE in the downlink or between itself and the BS in the uplink by scaling it in the common scaling factor $P_s$. The channel parameters including the number of MPCs and the associated spatial angles, powers, delays, etc., can also be generated in real-time by the processing unit and adaptively changed to emulate the relative movement between the BS and UE, where the connection between the processing unit and antenna arrays would be changed correspondingly.

Figure 7:
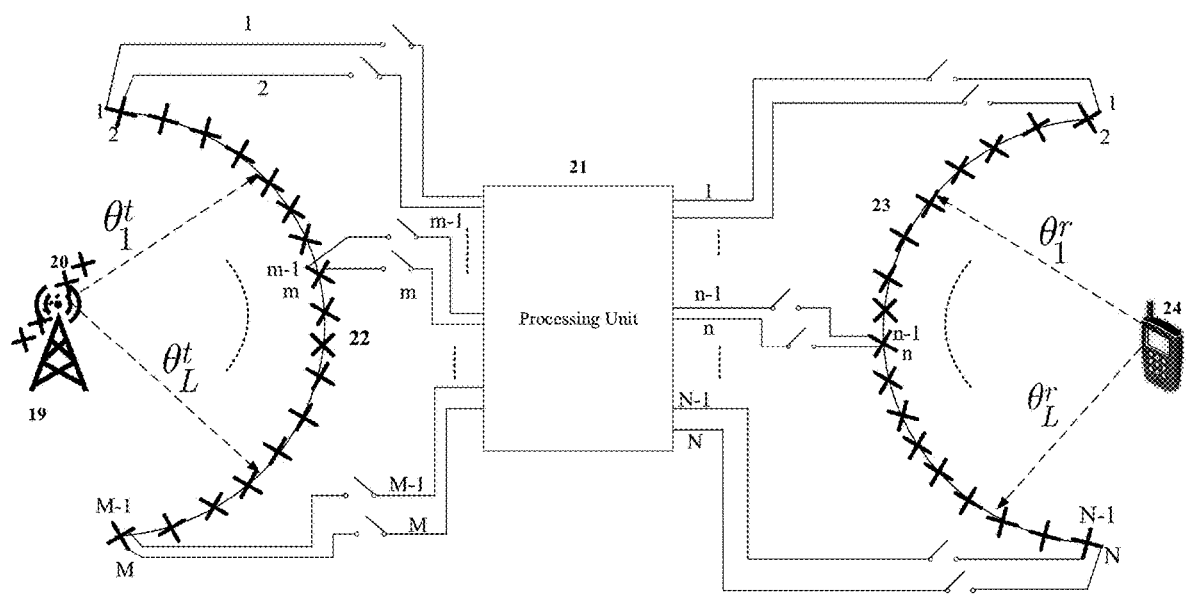
FIG. 7 shows a channel emulator for SU-MIMO with cross-polarized one dimensional antenna array

Another embodiment of this emulator emulating single-UE scanning and data transmission is shown in FIG. 7. The BS 19 is equipped with a linear antenna array 20 with ±45 cross-polarized antenna elements in the horizontal dimension, and the emulator 21 is equipped with two semicircle antenna arrays, 22, 23, with 2M and 2N±45° cross-polarized antenna elements, i.e., M and N pairs of co-located cross-polarized antennas respectively, in the horizontal dimension facing the BS antenna array 24 and UE antenna array respectively. For channel emulation, the BS antenna array is placed at the center of the semicircle antenna array of the channel emulator that faces the BS and the UE is placed at the center of the semicircle antenna array of the channel emulator that faces the UE. Before working in the channel emulation mode, the channel emulator first estimates polarization matrices between itself and the BS, e.g., $\Gamma_1^t, \ldots, \Gamma_M^t$, and between itself and the UE, e.g., $\Gamma_1^r, \ldots, \Gamma_L^t$. Then, the processing unit of emulator generates parameters for the channel between the BS and UE including the number of MPCs L, the angles associated to each MPC at the BS side, e.g., $\theta_1^t, \ldots, \theta_L^t$, the angles associated to each MPC at the UE side, e.g., $\theta_1^r, \ldots, \theta_L^r$, power fading factors associated to each MPC, e.g., $P_1, \ldots, P_L$, time delay associated to each MPC, e.g., $\tau_1, \ldots, \tau_L$, initial random phases, and the direction of relative movement between the UE and the BS. With $\theta_1^t, \ldots, \theta_L^t$, the processing unit looks up the table containing the mappings between each antenna element of the antenna array facing the BS and the corresponding spatial angle and determines those L pairs of co-located cross-polarized antennas $a_{1,1}^t, a_{1,2}^t, \ldots, a_{L,1}^t, a_{L,2}^t$ whose the associated angles are closest to $\theta_1^t, \ldots, \theta_L^t$ respectively. Then, the processing unit turns on the connection between itself and these L pairs antennas. With the similar method, the processing unit determines the L pairs of co-located cross-polarized antennas $a_{1,1}^r, a_{1,2}^r, \ldots, a_{L,1}^r, a_{L,2}^r$ in the antenna array facing the UE corresponding to $\theta_1^r, \ldots, \theta_L^r$ and turns on the connection between itself and these L pairs antennas. In the downlink, at the time instant t, the processing unit first receives the 2L RF signals from the L pairs connected antennas $a_{1,1}^t, a_{1,2}^t, \ldots, a_{L,1}^t, a_{L,2}^t$ facing the BS antenna array and converts them into digital signals, e.g., $y_{1,1}(t), y_{1,2}(t), \ldots, y_{L,1}(t), y_{L,2}(t)$. Let $y_l = [y_{l,1}(t)\, y_{l,2}(t)]^T$, $l=1, \ldots, L$, then it is first processed as $$z_l = [z_{l,1}(t)\, z_{l,2}(t)]^T = (\Gamma_{l_l^t}^t)^{-1} y_l, l=1, \ldots, L, \quad (1)$$

where the index $l_l^t$ corresponds to the co-located antenna pair $a_{l,1}^t, a_{l,2}^t$. Then, each element of $z_l$ is multiplied by a complex-valued number that is determined by the polarization slant angle at the BS, polarization slant angle at the UE, and other generated parameters as $\theta_l^t, \theta_l^r$, initial random phase, etc. This process is denoted by $$s_l = [s_{l,1}(t)\, s_{l,2}(t)]^T = [z_{l,1}(t)\alpha_{l,1}\, z_{l,2}(t)\alpha_{l,2}]^T. \quad (2)$$

After that, the $s_l$ is further processed as $$r_l = [r_{l,1}(t)\, r_{l,2}(t)]^T = (\Gamma_{l_l^r}^r)^{-1} s_l, l=1, \ldots, L. \quad (3)$$

Before being converted to analog signals, these signals are delayed and scaled as $P_s P_1 r_{1,1}(t-\tau_1)e^{j\omega_1 t}, P_s P_1 r_{1,2}(t-\tau_1)e^{j\omega_1 t} \ldots, P_s P_L r_{L,1}(t-\tau_L)e^{j\omega_L t}, P_s P_L r_{L,2}(t-\tau_L)e^{j\omega_L t}$, where $P_s$ is a common scaling factor emulating the path-loss level between the BS and UE, and $e^{j\omega_1 t} \ldots, e^{j\omega_L t}$ denote the Doppler effects caused by relative movement between the BS and UE for these L multi-paths. Finally, these L pairs of signals are converted to analog RF signals and transmitted to the UE through the L connected antennas pairs $a_{1,1}^r, a_{1,2}^r, \ldots, a_{L,1}^r, a_{L,2}^r$ facing the UE. In the uplink, at the time instant t, the processing unit first receives the 2L RF signals from the L pairs connected antennas $a_{1,1}^r, a_{1,2}^r, \ldots, a_{L,1}^r, a_{L,2}^r$ facing the UE and converts them into digital signals, e.g., $y_{1,1}(t), y_{1,2}(t), \ldots, y_{L,1}(t), y_{L,2}(t)$. Let $y_l = [y_{l,1}(t)\, y_{l,2}(t)]^T$, $l=1, \ldots, L$, then it is first processed as $$z_l = [z_{l,1}(t)\, z_{l,2}(t)]^T = (\Gamma_{l_l^r}^r)^{-1} y_l, l=1, \ldots, L, \quad (4)$$

where index $l_l^r$ corresponds to the co-located antenna pair $a_{l,1}^r, a_{l,2}^r$. Then, each element of $z_l$ is multiplied by a complex-valued number that is determined by the polarization slant angle at the BS, polarization slant angle at the UE, and other generated parameters as $\theta_l^t, \theta_l^r$, initial random phase, etc. This process is denoted by $$s_l = [s_{l,1}(t)\, s_{l,2}(t)]^T = [z_{l,1}(t)\alpha_{l,1}\, z_{l,2}(t)\alpha_{l,2}]^T, l=1, \ldots, L. \quad (5)$$

After that, the $s_l$ is further processed as $$r_l = [r_{l,1}(t)\, r_{l,2}(t)]^T = (\Gamma_{l_l^t}^t) s_l, l=1, \ldots, L. \quad (6)$$

Before being converted to analog signals, $s_1, \ldots, s_L$ are delayed and scaled as $P_s P_1 r_{1,1}(t-\tau_1) e^{j\omega_1 t}$, $P_s P_1 r_{1,2}(t-\tau_1) e^{j\omega_1 t} \ldots, P_s P_L r_{L,1}(t-\tau_L) e^{j\omega_L t}, P_s P_L r_{L,2}(t-\tau_L) e^{j\omega_L t}$, where $P_s$ is a common scaling factor emulating the path-loss level between the BS and UE, and $e^{j\omega_1 t} \ldots, e^{j\omega_L t}$ denote the Doppler effects caused by relative movement between the BS and UE for these L MPCs. Finally, these L pairs of signals are converted to analog RF signals and transmitted to the BS through the L connected antennas pairs $a_{1,1}^t$, $a_{1,2}^t \ldots, a_{L,1}^t, a_{L,2}^t$ facing the BS. Note that to emulate a specific path-loss level between the BS and UE or specific receiving signal strength at the UE or BS, the processing unit may need to remove the path-loss factor between itself and the UE in the downlink or between itself and the BS in the uplink by scaling it in the common scaling factor $P_s$. The channel parameters including the number of MPCs and the associated spatial angles, powers and delays can be generated offline, downloaded into the processing unit, and kept fixed in the whole emulation process or can be generated in real-time by the processing unit and adaptively changed to emulate the relative movement between the BS and UE, where the connection between the processing unit and antenna arrays would changes correspondingly.

Figure 8:
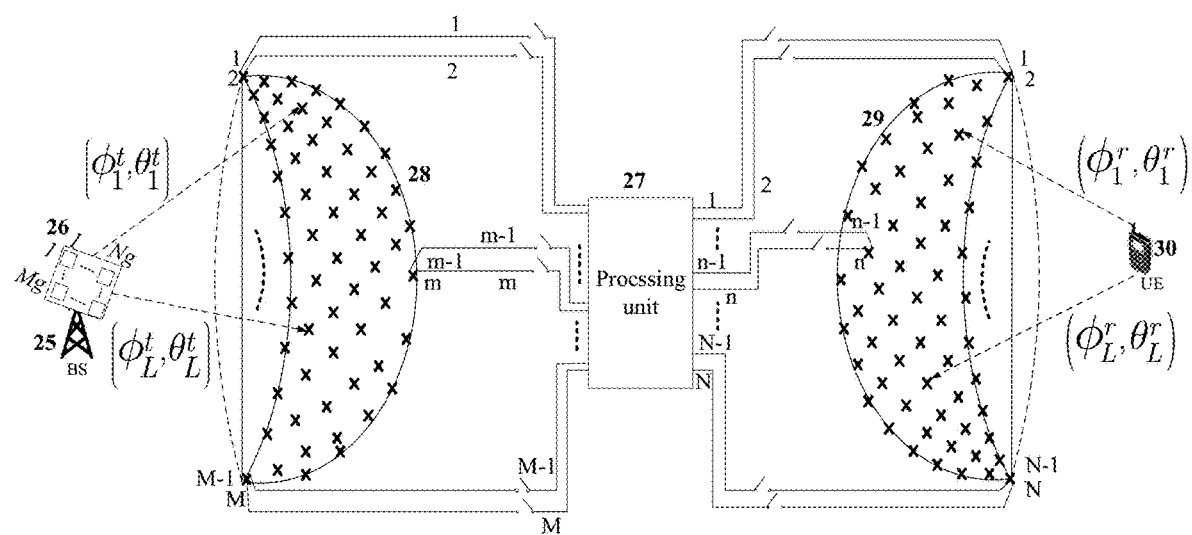
FIG. 8 shows a channel emulator for SU-MIMO with cross-polarized two dimensional spherical antenna array

Another embodiment of this emulator is to emulate single-UE scanning and data transmission is shown in FIG. 8. The BS 25 is equipped with a rectangular panel array 26, comprising $M_g \times N_g$ panels, where ±45° cross-polarized antenna elements are placed in the vertical and horizontal direction on each antenna panel, and the channel emulator 27 is equipped with two spherical antenna arrays, 28, 29, with 2M and 2N±45° cross-polarized antenna elements, i.e., M and N pairs of co-located cross-polarized antennas, on the sphere surface facing the BS antenna array and on the sphere surface facing the UE antenna array 30, respectively. For channel emulation, the BS antenna array is placed at the center of the spherical antenna array of the channel emulator that faces the BS and the UE is placed at the center of the spherical antenna array of the channel emulator that faces the UE. Before working in the channel emulation mode, the channel emulator first estimates the polarization matrices between itself and the BS, i.e., $\Gamma_1^t, \ldots, \Gamma_M^t$, and between itself and the UE, i.e., $\Gamma_1^r, \ldots, \Gamma_N^r$. Then, the processing unit of channel emulator generates parameters for the channel between the BS and UE including the number of MPCs L, the angles associated to each MPC at the BS side, e.g., $(\phi_1^t, \theta_1^t), \ldots, (\phi_L^t, \theta_L^t)$, the angles associated to each MPC at the UE side, e.g., $(\phi_1^r, \theta_1^r), \ldots, (\phi_L^r, \theta_L^r)$, the random initial phases associated to each MPC, the cross polarization coupling factors associated to each MPC, the relative movement direction between the UE and BS, and power and delay associated to each MPC, e.g., $P_1, \ldots, P_L$, and $\tau_1, \ldots, \tau_r$. With $(\phi_1^t, \theta_1^t), \ldots, (\phi_L^t, \theta_L^t))$, the processing unit looks up the table containing the mappings between each antenna element of the antenna array facing the BS and the corresponding spatial angles and determines those L pairs of co-located cross-polarized antennas $a_{1,1}^t, a_{1,2}^t \ldots, a_{L,1}^t, a_{L,2}^t$ whose associated angles are closest to $(\phi_1^t, \theta_1^t), \ldots, (\phi_L^t, \theta_L^t)$ respectively. Then, the processing unit turns on the connections between itself and these L pairs antennas. With the similar method, the processing unit determines the L pairs of co-located cross-polarized antennas $a_{1,1}^r, a_{1,2}^r \ldots, a_{L,1}^r, a_{L,2}^r$ in the antenna array facing the UE corresponding to $(\phi_1^r, \theta_1^r), \ldots, (\phi_L^r, \theta_L^r)$ and turns on the connections between itself and these L pairs of antennas. In the downlink, at the time t, the processing unit first receives the 2L RF signals from the L pairs connected antennas $a_{1,1}^t, a_{1,2}^t \ldots, a_{L,1}^t, a_{L,2}^t$ facing the BS antenna array and converts them into digital signals, e.g., $y_{1,1}(t), y_{1,2}(t), \ldots, y_{L,1}(t), y_{L,2}(t)$. Let $y_l = [y_{l,1}(t) \ y_{l,2}(t)]^T, l=1, \ldots, L$, then it is first processed as $$z_l = [z_{l,1}(t) z_{l,2}(t)]^T = (\Gamma_{l_l^t})^{-1} y_l, l=1, \ldots, L, \quad (7)$$

where the index $l_l^t$ corresponds to the co-located antenna pair $a_{l,1}^t, a_{l,2}^t$. Then, each element of $z_l$ is multiplied by a complex-valued number that is determined by the polarization slant angle at the BS, the polarization slant angle at the UE, and other generated parameters as $(\phi_l^t, \theta_l^t), (\phi_l^r, \theta_l^r)$, initial random phase, etc. This process is denoted by $$s_l = [s_{l,1}(t) s_{l,2}(t)]^T = [z_{l,1}(t) \alpha_{l,1} z_{l,2}(t) \alpha_{l,2}]^T. \quad (8)$$

After that, the $s_l$ is further processed as $$r_l = [r_{l,1}(t) r_{l,2}(t)]^T = (\Gamma_{l_l^r})^{-1} s_l, l=1, \ldots, L. \quad (9)$$

Before being converted to analog signals, these signals are delayed and scaled as $P_s P_1 r_{1,1}(t-\tau_1) e^{j\omega_1 t}, P_s P_1 r_{1,2}(t-\tau_1) e^{j\omega_1 t} \ldots, P_s P_L r_{L,1}(t-\tau_L) e^{j\omega_L t}, P_s P_L r_{L,2}(t-\tau_L) e^{j\omega_L t}$, where $P_s$ is a common scaling factor emulating the pathloss level between the BS and UE, and $e^{j\omega_1 t} \ldots, e^{j\omega_L t}$ denote the Doppler effects caused by relative movement between the BS and UE for these L MPCs. Finally, these L pairs signals are converted to analog RF signals and transmitted to the UE through the L connected antennas pairs $a_{1,1}^r, a_{1,2}^r \ldots, a_{L,1}^r, a_{L,2}^r$ facing the UE antenna array. In the uplink, at the time instant t, the processing unit first receives the 2L RF signals from the L pairs connected antennas $a_{1,1}^r, a_{1,2}^r \ldots, a_{L,1}^r, a_{L,2}^r$ facing the UE and converts them into digital signals, e.g., $y_{1,1}(t), y_{1,2}(t), \ldots, y_{L,1}(t), y_{L,2}(t)$. Let $y_l = [y_{l,1}(t) \ y_{l,2}(t)]^T, l=1, \ldots, L$, then it is first processed as $$z_l = [z_{l,1}(t) z_{l,2}(t)]^T = (\Gamma_{l_l^r})^{-1} y_l, l=1, \ldots, L, \quad (10)$$

where index $l_l^r$ corresponds to the co-located antenna pair $a_{l,1}^r, a_{l,2}^r$. Then each element of $z_l$ is multiplied by a complex-valued number that is determined by the polarization slant at the BS, polarization slant at the UE, other generated parameters as $(\phi_l^t, \theta_l^t), (\phi_l^r, \theta_l^r)$, initial random phase, etc. This process is denoted by $$s_l = [s_{l,1}(t) s_{l,2}(t)]^T = [z_{l,1}(t) \alpha_{l,1} z_{l,2}(t) \alpha_{l,2}]^T. \quad (11)$$

After that, the $s_l$ is further processed as $$r_l = [r_{l,1}(t) r_{l,2}(t)]^T = (\Gamma_{l_l^t})^{-1} s_l, l=1, \ldots, L. \quad (12)$$

Before being converted to analog signals, these signals are delayed and scaled as $P_s P_1 r_{1,1}(t-\tau_1) e^{j\omega_1 t}, P_s P_1 r_{1,2}(t-\tau_1) e^{j\omega_1 t} \ldots, P_s P_L r_{L,1}(t-\tau_L) e^{j\omega_L t}, P_s P_L r_{L,2}(t-\tau_L) e^{j\omega_L t}$, where $P_s$ is a common scaling factor emulating the path-loss level between the BS and UE, and $e^{j\omega_1 t} \ldots, e^{j\omega_L t}$ denote the Doppler effects caused by relative movement between the BS and UE for these L MPCs. Finally, these L pairs signals are converted to analog RF signals and transmitted to the BS through the L connected antenna pairs $a_{1,1}^t, a_{1,2}^t \ldots, a_{L,1}^t, a_{L,2}^t$ facing the BS. Note that to emulate specific path-loss between the BS and UE or specific receiving signal strength at the UE or BS, the processing unit may need to remove the path-loss factor between itself and the UE in the downlink or between itself and the BS in the uplink by including it in the common scaling factor $P_s$. The channel parameters including the number of multi-paths and the associated spatial angles, power levels, delays, etc., can be generated offline, downloaded into the processing unit, and kept fixed in the whole emulation process or can be generated in real-time by the processing unit and adaptively changed to emulate the relative movement between the BS and UE, where the connection between the processing unit and antenna arrays would changes correspondingly.

Multi-User Communication

Figure 9:
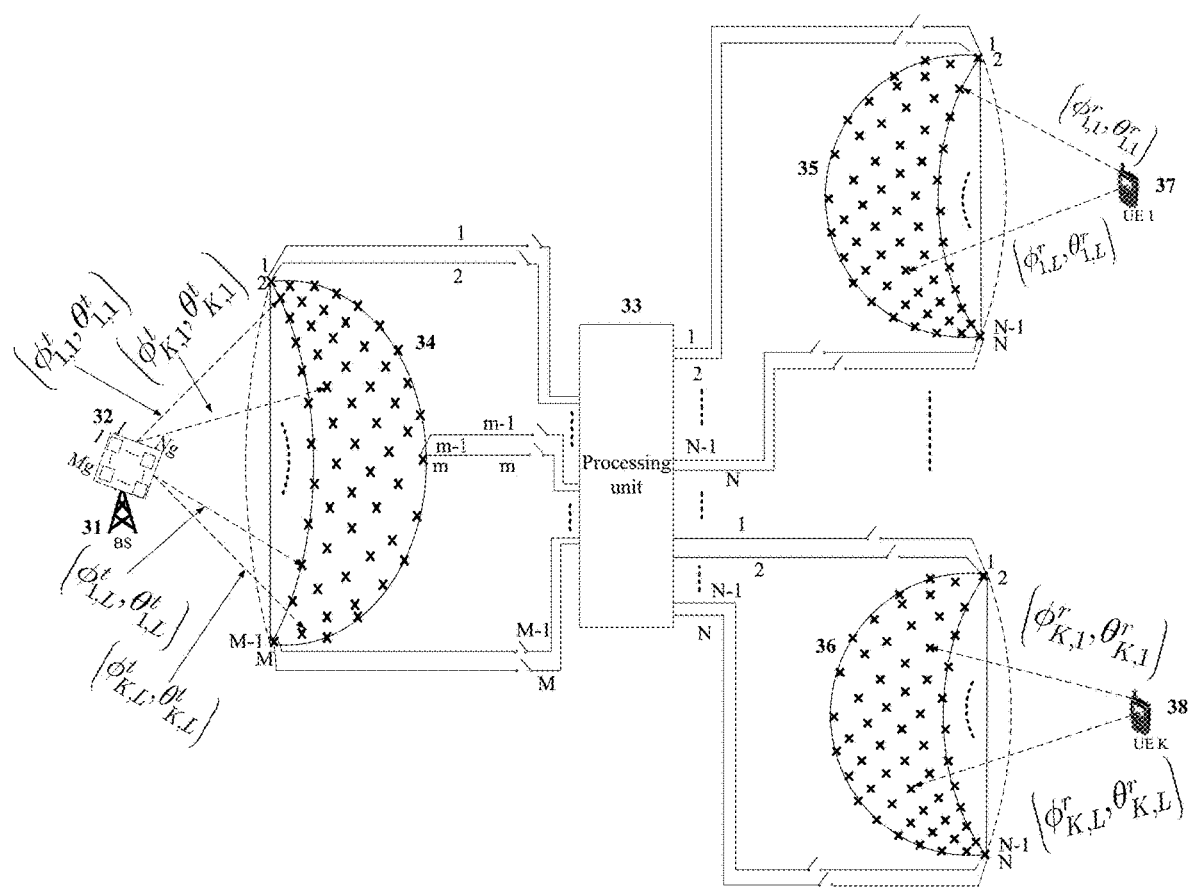
FIG. 9 shows a channel emulator for MU-MIMO with cross-polarized two dimensional spherical antenna array

One embodiment of this channel emulator is used to emulate K UEs beam scanning and data transmission, where these K UEs are scheduled on the same radio resources simultaneously, e.g., MU-MIMO technique. As shown in FIG. 9, the BS 31 is equipped with a rectangular panel array 32, comprising $M_g \times N_g$ panels, where ±45° cross-polarized antenna elements are placed in the vertical and horizontal directions on each antenna pane. The channel emulator 33 is equipped with a spherical antenna array 34 with 2M±45° cross-polarized antenna elements, i.e., M pairs of co-located cross-polarized antennas, on the sphere surface facing the BS antenna array. The emulator is also equipped K spherical antenna arrays 35, 36, facing these K UEs, 37, 38, where each spherical antenna array consists of 2N±45° cross-polarized antenna elements, i.e., N pairs of co-located cross-polarized antennas, on the sphere surface. For channel emulation, the BS antenna array is placed at the center of the spherical antenna array of the channel emulator that faces the BS antenna array and each UE is placed at the center of an exclusive spherical antenna array of the channel emulator that faces these K UEs. Before working in the channel emulation mode, the channel emulator first estimates the polarization matrices between itself and the BS, i.e., $\Gamma_1^t, \ldots, \Gamma_M^t$, for each pair of cross-polarized antennas, and between each UE and each pair of cross-polarized antennas facing this UE, i.e., $\Gamma_{1,1}^r, \ldots, \Gamma_{1,N}^r, \ldots, \Gamma_{K,1}^r, \ldots, \Gamma_{K,N}^r$. Then, the processing unit of emulator generates parameters for the channel coefficients between the BS and the $k^{th}$ UE, $k=1, \ldots, K$, including the number of MPCs $L_k$, the angles associated to each MPC at the BS side, e.g., $(\phi_{k,1}^t, \theta_{k,1}^t), \ldots, (\phi_{k,L_k}^t, \theta_{k,L_k}^t)$, the angles associated to each MPC at the $k^{th}$ UE side, e.g., $(\phi_{k,1}^r, \theta_{k,1}^r), \ldots, (\phi_{k,L_k}^r, \theta_{k,L_k}^r)$, the random initial phases associated to each MPC, the cross polarization coupling factors associated to each MPC, the relative movement direction associated to each $k^{th}$ UE and BS, and power and delay associated to each MPC, e.g., $P_{k,1}, \ldots, P_{k,L_k}$, and $\tau_{k,1}, \ldots, \tau_{k,L_k}$. For the $k^{th}$ UE, $k=1, \ldots, K$, with $(\phi_{k,1}^t, \theta_{k,1}^t), \ldots, (\phi_{k,L_k}^t, \theta_{k,L_k}^t)$, the processing unit of the channel emulator looks up the table containing the mappings between each antenna element of the antenna array facing the BS and the corresponding spatial angles and determines those $L_k$ pairs of co-located cross-polarized antennas $a_{1,1}^{k,t}, a_{1,2}^{k,t} \ldots, a_{L_k,1}^{k,t}, a_{L_k,2}^{k,t}$ whose associated angles are closest to $(\phi_1^t, \theta_1^t), \ldots, (\phi_{L_k}^t, \theta_{L_k}^t)$ respectively. Then, the processing unit turns on the connections between itself and these $L_k$ pairs of antennas for the $k^{th}$ UE. With the similar method, for the $k^{th}$ UE, $k=1, \ldots, K$, the processing unit determines the $L_k$ pairs of co-located cross-polarized antennas $a_{1,1}^{k,r}, a_{1,2}^{k,r} \ldots, a_{L_k,1}^{k,r}, a_{L_k,2}^{k,r}$ in the antenna array facing the $k^{th}$ UE corresponding to $(\phi_1^r, \theta_1^r), \ldots, (\phi_{L_k}^r, \theta_{L_k}^r)$ and turns on the connections between itself and these $L_k$ pairs antennas. In the downlink, at the time instant t, the processing unit first receives $2(L_1 + \ldots + L_k)$ RF signals from the $(L_1 + \ldots + L_k)$ pairs of connected antennas $a_{1,1}^{1,t}, a_{1,2}^{1,t} \ldots, a_{L_1,1}^{1,t}, a_{L_1,2}^{1,t}, \ldots, a_{L_K,1}^{K,t}, a_{L_K,2}^{K,t}$ facing the BS and converts them into digital signals, e.g., $y_{1,1}^1(t), y_{1,2}^1(t), \ldots, y_{L_1,1}^1(t), y_{L_1,2}^1(t), \ldots y_{L_K,1}^K(t), y_{L_K,2}^K(t)$. For the $k^{th}$ UE, let $y_{k,l} = [y_{l,1}^k(t), y_{l,2}^k(t)]^T, l=1, \ldots, L_k$, then it is first processed as $$z_{k,l} = [z_{l,1}^k(t) z_{l,2}^k(t)]^T = (\Gamma_{l_k,l}^t)^{-1} y_{k,l}, l=1, \ldots, L_k, \quad (13)$$

where the index $l_{k,l}^t$ corresponds to the co-located antenna pair $a_{l,1}^{k,t}, a_{l,2}^{k,t}$. Then, each element of $z_{k,l}$ is multiplied by a complex-valued number that is determined by the polarization slant angle at the BS, the polarization slant angle at the $k^{th}$ UE, and other generated parameters as $(\phi_{k,l}^t, \theta_{k,l}^t), (\phi_{k,l}^r, \theta_{k,l}^r)$, initial random phase, etc. This process is denoted by $$s_{k,l} = [s_{l,1}^k(t) s_{l,1}^k(t)]^T = [z_{l,1}^k(t) \alpha_{l,1} z_{l,2}^k(t) \alpha_{l,2}^k]^T, k=1, \ldots, K, l=1, \ldots, L_k. \quad (14)$$

After that, the $s_{k,l}$ is further processed as $$r_{k,l} = [r_{l,1}^k(t) r_{l,1}^k(t)]^T = (\Gamma_{l_k,l}^r)^{-1} s_{k,l}, k=1, \ldots, K, l=1, \ldots, L_k. \quad (15)$$

where the index $l_{k,l}^r$ corresponds to the co-located antenna pair $a_{l,1}^{k,r}, a_{l,2}^{k,r}$. Before being converted to analog signals, for the $k^{th}$ UE, all these digital signals are delayed and scaled as $$P_{1,1} r_{l,1}^k (t-\tau_{k,1}) e^{j\omega_{k,1} t}, P_s P_1 r_{l,2}^k (t-\tau_{k,1}) e^{j\omega_{k,1} t} \ldots,$$
$$P_{k,s} P_{k,L_k} r_{L_k,1}^k (t-\tau_{k,L_k}) e^{j\omega_{k,L_k} t}, P_{k,s} P_{k,L_k} r_{L_k,2}^k (t-\tau_{k,L_k}) e^{j\omega_{k,L_k} t},$$

where $P_{k,s}$ is a common scaling factor emulating the pathloss level between the BS and the $k^{th}$ UE, and $$e^{j\omega_{k,1} t} \ldots, e^{j\omega_{k,L_k} t}$$

denote the Doppler effects caused by relative movement between the BS and the $k^{th}$ UE for these $L_k$ MPCs. Finally, these $L_k$ pairs of signals for the $k^{th}$ UE are converted to analog RF signals and transmitted to the $k^{th}$ UE through the $L_k$ connected antennas pairs $a_{1,1}^{k,r}, a_{1,2}^{k,r} \ldots, a_{L_k,1}^{k,r}, a_{L_k,2}^{k,r}$ facing the $k^{th}$ UE. In the uplink, at time instant t, the processing unit first receives the $2(L_1 + \ldots + L_k)$ RF signals from the $(L_1 + \ldots + L_k)$ pairs connected antennas $a_{1,1}^{1,r}, a_{1,2}^{1,r} \ldots, a_{L_1,1}^{1,r}, a_{L_1,2}^{1,r}, \ldots, a_{L_K,1}^{K,r}, a_{L_K,2}^{K,r}$ facing these K UEs and converts them into digital signals, e.g., $y_{1,2}^1(t), y_{1,2}^1(t), \ldots, y_{L_1,1}^1(t), y_{L_1,2}^1(t), \ldots, y_{L_K,1}^K(t), y_{L_K,2}^K(t)$. let $y_{k,l} = [y_{l,1}^k(t), y_{l,2}^k(t)]^T, l=1, \ldots, L_k$, then it is first processed as $$z_{k,l} = [z_{l,1}^k(t) z_{l,2}^k(t)]^T = (\Gamma_{l_k,l}^r)^{-1} y_{k,l}, l=1, \ldots, L_k, \quad (16)$$

where index $l_{k,l}^r$ corresponds to the co-located antenna pair $a_{l,1}^{k,r}, a_{l,2}^{k,r}$. Then, each element of $z_{k,l}$ is multiplied by a complex-valued number that is determined by the polarization slant angle at the BS, the polarization slant angle at the $k^{th}$ UE, and other generated parameters as $(\phi_{k,l}^t, \theta_{k,l}^t), (\phi_{k,l}^r, \theta_{k,l}^r)$, initial random phase, etc. This process is denoted by $$s_{k,l} = [s_{l,1}^k(t) s_{l,1}^k(t)]^T = [z_{l,1}^k(t) \alpha_{l,1} z_{l,2}^k(t) \alpha_{l,2}]^T, k=1, \ldots, K, l=1, \ldots, L_k. \quad (17)$$

After that, $s_{k,l}$ is further processed as $$r_{k,l} = [r_{l,1}^k(t) r_{l,1}^k(t)]^T = (\Gamma_{l_k,l}^t)^{-1} s_{k,l}, k=1, \ldots, K, l=1, \ldots, L_k. \quad (18)$$

Before being converted to analog signals, for the $k^{th}$ UE, all these digital signals are delayed and scaled as $$P_{k,s} P_{k,1} r_{l,1}^k (t-\tau_{k,1}) e^{j\omega_{k,1} t}, P_{k,s} P_{k,1} r_{l,2}^k (t-\tau_{k,1}) e^{j\omega_{k,1} t} \ldots,$$
$$P_{k,s} P_{k,L_k} r_{L_k,1}^k (t-\tau_{k,L_k}) e^{j\omega_{k,L_k} t}, P_{k,s} P_{k,L_k} r_{L_k,2}^k (t-\tau_{k,L_k}) e^{j\omega_{k,L_k} t},$$

where $P_{k,s}$ is a common scaling factor emulating the pathloss level between the BS and the $k^{th}$ UE, and $e^{j\omega_{k,1}t} \ldots, e^{j\omega_{k,L_k}t}$ denote the Doppler effects caused by relative movement between the BS and the $k^{th}$ UE for these $L_k$ MPCs. Finally, these $L_k$ pairs of signals for the $k^{th}$ UE are converted to analog RF signals and transmitted to the BS through the $L_k$ connected antennas pairs $a_{1,1}^{k,t}$, $a_{1,2}^{k,t}$ ..., $a_{L_k,1}^{k,t}$, $a_{L_k,2}^{k,t}$ facing the BS. Note that to emulate a specific path-loss level between the BS and the $k^{th}$ UE or specific receiving signal strength at the $k^{th}$ UE or BS, the processing unit may need to remove the path-loss factor between itself and the $k^{th}$ UE by including it in the common scaling factor $P_{k,s}$. The channel parameters including the number of MPCs and the associated spatial angles, power levels, delays, and other related parameters can be generated offline, downloaded into the processing unit, and kept fixed in the whole emulation process or can be generated in real-time and adaptively changed to emulate the relative movement between the BS and UE.

Figure 10:
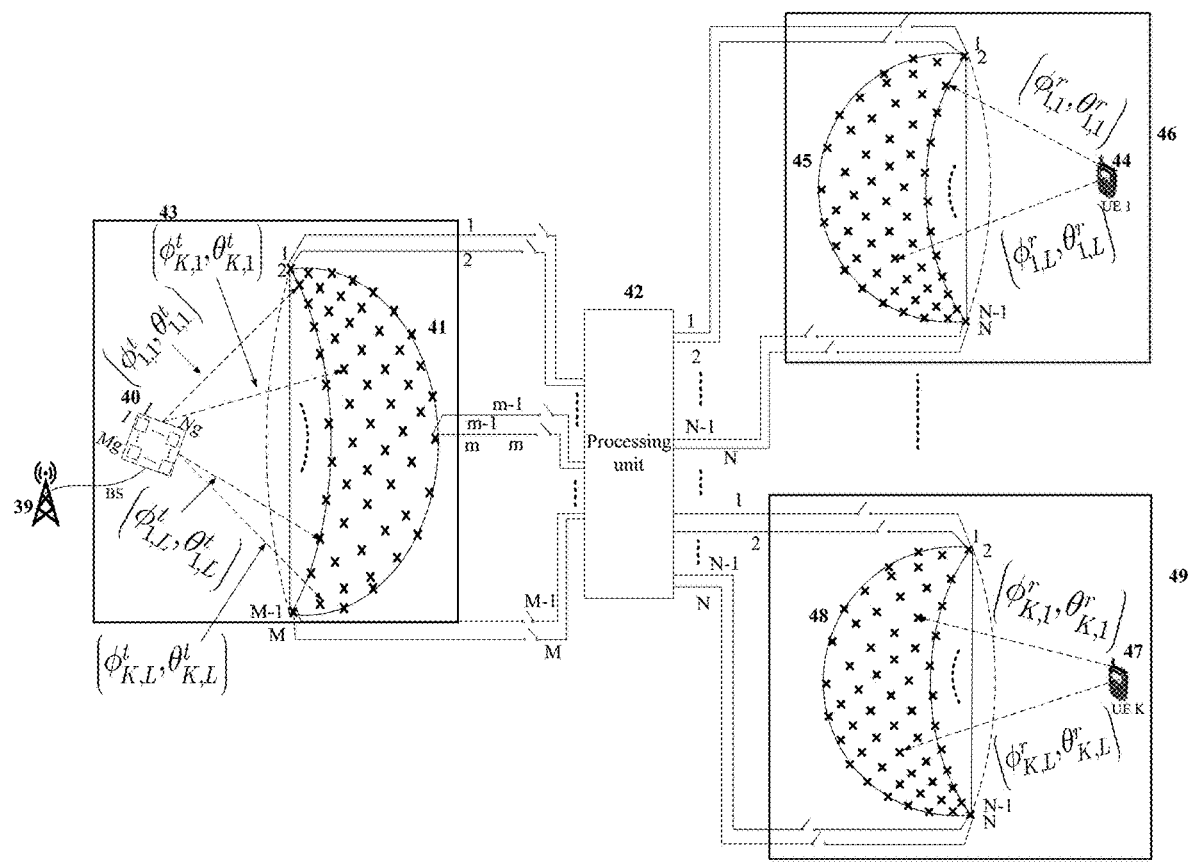
FIG. 10 shows a channel emulator for MU-MIMO with cross-polarized two dimensional spherical antenna array, where the antenna arrays are placed in sealed chambers

To create a line of sight channel condition without any electromagnetic interference between the BS antenna array and the antenna array facing the BS at the channel emulator, these two antenna arrays can be placed in a sealed chamber or container when emulating the millimeter wave wireless communication systems. Similarly, the antenna array of a UE and the antenna array facing this UE at the channel emulator can also be placed in a sealed chamber or container when emulating millimeter wave wireless communication systems. FIG. 10 shows an embodiment. The processing units of the BS, e.g., radio unit, 39 and its antenna array 40 is connected through a cable. The antenna array 41 facing the BS at the channel emulator 42 and the BS antenna array are placed in a sealed chamber 43. At the UE sides, two of K UEs are shown in this figure. The first UE 44 and the antenna array 45 facing this UE at the channel emulator are placed in a sealed chamber 46. The last UE 47 and the antenna array 48 communicating with this UE at the channel emulator are placed in another sealed chamber 49.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. An apparatus for emulating millimeter wave wireless communication channels comprising
   an antenna array with M antenna elements facing a Base Station (BS) for communicating with the BS over-the-air (OTA) wherein the BS transmits to or receives signals from K (K≥1) User Equipment (UEs) on the same frequency and time resource;
   M paths that connect the M antenna elements to a first set of RF paths comprising receiving RF circuits including converting RF signal to digital signal and/or transmitting RF circuits including converting digital signal to RF signal, wherein the connection of each of the M paths to a RF path can be turned on or off using an adaptively controlled switch;
   one or more antenna arrays facing the UEs wherein each antenna array facing one or more UEs has $N_k$ antenna elements for communicating with the one or more UEs over-the-air;
   $N_k$ paths for each of the antenna arrays facing the UEs that connect the $N_k$ antenna element to a second set of RF paths comprising receiving RF circuits including converting RF signal to digital signal and/or transmitting RF circuits including converting digital signal to RF signal, wherein the connection of each of the $N_k$ paths to a RF path can be turned on or off using an adaptively controlled switch; and,
   a processing unit that generates, receives or stores in a memory parameters for generating the channel coefficients or the channel coefficients which emulate the actual over-the-air channel from the BS to the UEs and/or the actual over-the-air channel from the UEs to the BS; and, in the downlink, selects to turn on the connection of a subset of the M paths and the associated antenna elements in the antenna array facing the BS to the first set of RF paths with receiving RF circuits including converting RF signal to digital signal, selects to turn on the connection of a subset of the $N_k$ paths and the associated antenna elements for each of the antenna array(s) facing the UE(s) to the second set of RF paths with transmitting RF circuits including converting digital signal to RF signal, receives RF signals of the BS from the subset of the M paths, converts the RF signals to digital signals, processes the digital signals using channel coefficients to emulate the actual over-the-air channel from the BS to the UE(s), converts the processed digital signals to RF signals, and transmits the RF signals to the UE(s) through the subset of the $N_k$ paths of each of the antenna array(s) facing the UE(s), and in the uplink, selects to turn on the connection of a subset of the M paths and the associated antenna elements in the antenna array facing the BS to the first set of RF paths with receiving RF circuits including converting RF signal to digital signal, selects to turn on the connection of a subset of the $N_k$ paths and the associated antenna elements for each of the antenna array(s) facing the UE(s) to the second set of RF paths with transmitting RF circuits including converting digital signal to RF signal, receives RF signals from the UE(s) through the subset of the $N_k$ paths of each of the antenna array(s) facing the UE(s), converts the RF signals to digital signals, processes the digital signals using channel coefficients to emulate the actual over-the-air channel from the UE(s) to the BS, converts the processed digital signals to RF signals, and transmits the RE signals to the BS through the subset of the M paths.

2. The apparatus in claim 1 wherein the antenna array facing the BS is a one dimensional fan-shaped array, semi-circular array or two dimension spherical array, wherein the antenna elements are single-polarized or cross-polarized.

3. The apparatus in claim 1 wherein each of the antenna arrays facing the UEs is a one dimensional fan-shaped arrays, a semi-circular array or a two dimensional spherical array, wherein the antenna elements are single-polarized or cross-polarized.

4. The apparatus in claim 1 wherein the memory in the processing unit stores a spatial angle or a pair of spatial angles associated with each antenna element in the antenna array facing the BS, and/or a spatial angle or a pair of spatial angles associated with each antenna element in each of the antenna arrays facing the UEs, wherein the angle(s) are determined by the position of each antenna element in the antenna array.

5. The apparatus in claim 1 wherein the memory in the processing unit stores in a table the mappings between each antenna element of the antenna array facing the BS and the corresponding spatial angles, looking up this table to select the antenna elements whose associated angles are closest to the angles associated with each multi-path at the BS side, and connecting RF paths to the selected antenna elements, and/or storing in a table the mappings between each antenna element of the antenna array(s) facing the UE(s) and the corresponding spatial angles, looking up this table to select the antenna elements whose associated angles are closest to the angles associated with each multi-path at the UE(s) side, and connecting RF paths to the selected antenna elements.

6. The apparatus in claim 1 wherein the processing unit receives pilot signal(s) from the BS, estimates the polarization matrices between the BS and each pair of cross-polarized antennas in the antenna array facing the BS using the received pilot signal(s) from the BS, and stores the estimates of the polarization matrices in the memory of the processing unit, and/or the processing unit receives pilot signals from a UE, estimates the polarization matrices between the UE and each pair of cross-polarized antennas in the antenna array that faces the UE using the received pilot signal(s) from the UE(s), and stores the estimates of the polarization matrices in the memory of the processing unit.

7. The apparatus in claim 1 wherein the parameters for generating the channel coefficients or the channel coefficients emulating the actual over-the-air channel including the effect of one or more of multi-path delay, the number of multi-paths, the angles at the BS associated with each multi-path, the angles at the UE(s) associated with each multi-path, the time delay and power associated to each multipath, power fading, Doppler effect, the direction of relative movement between the BS and the UE(s), the random initial phases, polarization, depolarization, and the polarization coupling factors.

8. The apparatus in claim 1 wherein the processing unit selects antenna elements of the antenna array facing the BS to connect to RF paths based on the angles associated with each multi-path at the BS and the angles associated with the antenna elements of the antenna array facing the BS, and/or selects antenna elements of each of the antenna arrays facing the UE(s) to connect to RF paths based on the angles associated with each multi-path at the UEs and the angles associated with the antenna elements of each of the antenna array(s) facing the UE(s).

9. A method for emulating a millimeter wave wireless communication system comprising using a Base Station (BS) equipped with an antenna with multiple antenna elements and RF circuits to transmit or receive RF signals over-the-air to or from a channel emulator that is equipped with an antenna facing the BS and has M antenna elements;

selecting a subset of the M antenna elements of the antenna facing the BS and connect them to RF paths in the channel emulator to receive or transmit RF signal from or to the BS;

using K User Equipment (UEs) each of which is equipped with an antenna and RF circuits to transmit or receive RF signals over-the-air to or from the channel emulator that is equipped with one or more antennas that face the UE(s) and each of the antennas has a plural of antenna elements;

selecting a subset of the plural of antenna elements of the one or more antennas facing the UE(s) and connect them to RF paths in the channel emulator to receive or transmit RF signal from or to the UE(s);

converting the received RF signals from the BS and from the UE(s) into digital signals;

generating, receiving or storing in a memory of the channel emulator parameters for generating the channel coefficients or the channel coefficients which emulate the actual over-the-air channel from the BS to the UE(s) and/or the actual over-the-air channel from the UE(s) to the BS;

in the downlink, using the channel emulator to process the digital signals converted from the RF signals received from the BS using the channel coefficients to emulate the actual over-the-air channel from the BS to the UE(s), converting the processed digital signals to RF signals, and transmitting the RF signals to the UE(s) through the subset of the plural of antenna elements of each of the antenna(s) facing the UE(s); and, in the uplink, using the channel emulator to process the digital signals converted from the RF signals received from the UE(s) using the channel coefficients to emulate the actual over-the-air channel from the UE(s) to the BS, converting the processed digital signals to RF signals, and transmitting the RF signals to the BS through the subset of the M paths.

10. The method in claim 9 wherein processing the digital signals emulates the actual over-the-air channel including the effect of one or more of multi-path delay, the number of multi-paths, the angles at the BS associated with each multi-path, the angles at the UE(s) associated with each multi-path, the time delay and power associated to each multipath, power fading, Doppler effect, the direction of relative movement between the BS and the UE(s), the random initial phases, polarization, depolarization, and the polarization coupling factors.

11. The method in claim 9 further comprising selecting two cross-polarized antenna elements at the BS to transmit pilots to the channel emulator in two mutually orthogonal radio resources, receiving the pilot signals at the channel emulator's antenna array facing the BS, estimating the polarization matrices between the BS and channel emulator for each of its M cross-polarized antenna pairs, and/or selecting two cross-polarized antenna elements at a UE to transmit pilots to the channel emulator in two mutually orthogonal radio resources, receiving the pilot signals at one or more of the channel emulator's antenna(s) facing the UE, estimating the polarization matrices between the UE and channel emulator for each of its cross-polarized antenna pairs.

12. The method in claim 9 further comprising storing a spatial angle or a pair of spatial angles associated with each antenna element in the channel emulator's antenna facing the BS, and/or a spatial angle or a pair of spatial angles associated with each antenna element in each of the channel emulator's antenna(s) facing the UEs, wherein the angle(s) are determined by the position of each antenna element in the antennas.

13. The method in claim 9 further comprising storing in a table the mappings between each antenna element of the channel emulator's antenna facing the BS and the corresponding spatial angles, looking up this table to select the antenna elements whose associated angles are closest to the angles associated with each multi-path at the BS side, and connecting RF paths to the selected antenna elements, and/or storing in a table the mappings between each antenna element of the channel emulator's antenna facing the UE(s) and the corresponding spatial angles, looking up this table to select the antenna elements whose associated angles are closest to the angles associated with each multi-path at the UE(s) side, and connecting RF paths to the selected antenna elements.

14. The method in claim 9 further comprising placing the antenna of the BS and the channel emulator's antenna facing the BS and/or the antennas of the UE(s) and the channel emulator's antenna(s) facing the UE(s) in a chamber or container to create a line of sight channel condition without electromagnetic interference.

15. The method in claim 9 further comprising selecting antenna elements of the channel emulator's antenna facing the BS to connect to RF paths of the channel emulator based on the angles associated with each multi-path at the BS and the angles associated with the antenna elements of the channel emulator's antenna facing the BS, and/or selecting antenna elements of each of the channel emulator's antenna(s) facing the UE(s) to connect to RF paths of the channel emulator based on the angles associated with each multi-path at the UEs and the angles associated with the antenna elements of each of the channel emulator's antenna(s) facing the UE(s).

16. The method in claim 9 further comprising using the BS to transmit pilot signal(s) to the channel emulator from a pair of cross-polarized antenna elements when cross-polarized antennas are used at the BS, estimating the polarization matrices between the BS and each pair of cross-polarized antenna elements of the channel emulator's antenna facing the BS based on the received pilot signals from the BS, and storing the estimates of the polarization matrices in the memory of the channel emulator, and/or using a UE to transmit pilot signal(s) to the channel emulator from a pair of cross-polarized antenna elements when cross-polarized antennas are used at the UE, estimating the polarization matrices between the UE and each pair of cross-polarized antenna elements of the channel emulator's antenna facing the UE based on the received pilot signals from the UE, and storing the estimates of the polarization matrices in the memory of the channel emulator.

17. The method in claim 9 further comprising placing the antenna of the BS at or near the center of the channel emulator's antenna facing the BS, and/or placing the antenna of a UE at the center of one of the channel emulator's antennas facing the UE.

* * * * *